US009552828B2

(12) United States Patent
Sugano

(10) Patent No.: US 9,552,828 B2
(45) Date of Patent: Jan. 24, 2017

(54) AUDIO SIGNAL PROCESSING DEVICE

(71) Applicant: JVC KENWOOD Corporation, Yokohama-shi, Kanagawa (JP)

(72) Inventor: Masato Sugano, Yokohama (JP)

(73) Assignee: JVC KENWOOD CORPORATION, Yokohama-shi, Kanagawa (JP)

( * ) Notice: Subject to any disclaimer, the term of this patent is extended or adjusted under 35 U.S.C. 154(b) by 46 days.

(21) Appl. No.: 14/625,002

(22) Filed: Feb. 18, 2015

(65) Prior Publication Data
US 2015/0245137 A1 Aug. 27, 2015

(30) Foreign Application Priority Data

Feb. 27, 2014 (JP) .................................. 2014-036372
Sep. 18, 2014 (JP) .................................. 2014-190137

(51) Int. Cl.
*H04B 15/00* (2006.01)
*G10L 21/0232* (2013.01)
*H04B 3/20* (2006.01)

(52) U.S. Cl.
CPC ............. *G10L 21/0232* (2013.01); *H04B 3/20* (2013.01); *H04B 15/00* (2013.01)

(58) Field of Classification Search
CPC ....... H04R 29/005; H04R 29/006; H04R 3/00; G10L 21/0232; H04B 3/20; H04B 15/00
(Continued)

(56) References Cited

U.S. PATENT DOCUMENTS 7,672,466 B2 * 3/2010 Yamada ................. G10H 1/361
379/406.01
2005/0078840 A1 * 4/2005 Riedl ..................... H03G 7/007
381/104
(Continued)

FOREIGN PATENT DOCUMENTS

JP 2006-197552 A 7/2006

OTHER PUBLICATIONS

Alexander Jourjine, Scott Rickard, Ozgur Yilmaz, "Blind Separation of Disjoint Orthogonal Signals: Demixing N Sources From 2 Mixtures", ICASSP2000, Jun. 5-9, 2000.

*Primary Examiner* — Disler Paul
(74) *Attorney, Agent, or Firm* — Procopio, Cory, Hargreaves & Savitch LLP

(57) ABSTRACT

An audio signal processing device includes: a frequency-domain conversion unit that generates a plurality of pieces of frequency-domain information from a plurality of audio input signals acquired at different positions; a relative value calculation unit that calculates, for each piece of frequency-domain information, a relative value between a time-frequency component included in one frequency-domain information and a time-frequency component included in another frequency-domain information; a mask generation unit that compares the relative value with an emphasized range set based on a relative value threshold stored in advance to generate a time-frequency mask that decreases a value of the frequency-domain information corresponding to the relative value which is outside the emphasized range; a mask multiplication unit that multiplies the time-frequency mask by the frequency-domain information to generate emphasized frequency-domain information; and a time-domain conversion unit that converts the emphasized frequency-domain (Continued)

information into an audio output signal indicated as being time-domain information.

7 Claims, 13 Drawing Sheets

(58) Field of Classification Search
USPC .......... 381/91–92, 122, 94.1, 94.3, 66, 73.1
See application file for complete search history.

(56) References Cited

U.S. PATENT DOCUMENTS

| | | | |
|---|---|---|---|
| 2008/0317260 A1* | 12/2008 | Short | ...................... G10L 21/02 |
| | | | 381/92 |
| 2009/0323977 A1 | 12/2009 | Kobayashi et al. | |
| 2011/0070926 A1* | 3/2011 | Vitte | .................. G10L 21/0208 |
| | | | 455/569.2 |

* cited by examiner

AUDIO SIGNAL PROCESSING DEVICE

INCORPORATION BY REFERENCE

This application is based upon and claims the benefit of priority from Japanese patent application No. 2014-036372, filed on Feb. 27, 2014 and Japanese patent application No. 2014-190137, filed on Sep. 18, 2014, the disclosure of which is incorporated herein in its entirety by reference.

BACKGROUND OF THE INVENTION

1. Field of the Invention

The present invention relates to an audio signal processing device, and more specifically, to an audio signal processing device that emphasizes a predetermined audio signal.

2. Description of Related Art

In recent years, techniques for performing various processes on audio signals have been proposed for the purpose of improving the quality of sound transmission or sound recognition rate. Japanese Unexamined Patent Application Publication No. 2006-197552 and Alexander Jourjine, Scott Rickard, Ozgur Yilmaz, "BLIND SEPARATION OF DISJOINT ORTHOGONAL SIGNALS", ICASSP2000 (Alexander et. Al.) propose one technique for emphasizing an audio signal (hereinafter referred to as a desired audio signal) that complies with a predetermined condition and suppressing undesired signals other than the predetermined audio signal using a sound source separation technique.

Japanese Unexamined Patent Application Publication No. 2006-197552 discloses a technique of performing sound source separation of a target sound and a disturbance sound by a linear combination process of audio signals input to a plurality of microphones to emphasize the target sound. Alexander et. Al. discloses a method for generating a time-frequency mask in a frequency area, emphasizing a desired signal and suppressing other undesired signals by a masking process, thereby separating audio signals into signals for each sound source. Specifically, Alexander et. Al. calculates an amplitude ratio and a phase difference for each of time-frequency components from audio signals input from two sensors to generate a two-dimensional histogram, and clusters the time-frequency component in the histogram to calculate peak coordinates (amplitude ratio, phase difference) for each sound source. A time-frequency mask is then generated based on the coordinates to carry out processing for multiplying an original signal by a mask. According to this method, the sound source separation effects are obtained.

SUMMARY OF THE INVENTION

However, reverberation can easily occur in a space such as an automobile which is narrowly closed, and the sound source separation effects by the linear combination process in the system disclosed in Japanese Unexamined Patent Application Publication No. 2006-197552 are limited.

In the sound source separation method disclosed in Alexander et. Al., the peak of the histogram becomes dull due to reverberation components. Moreover, due to noise, the histogram is uniformly distributed with less undulations, and it is difficult to accurately calculate peak coordinates by the clustering of the histogram.

In summary, in the techniques disclosed in Japanese Unexamined Patent Application Publication No. 2006-197552 or Alexander et. Al., it is impossible to sufficiently carry out sound source separation and to sufficiently emphasize the desired audio signal.

The present invention provides an audio signal processing device including: a frequency-domain conversion unit that converts each of a plurality of audio input signals acquired at different positions into frequency-domain information to generate a plurality of pieces of frequency-domain information; a relative value calculation unit that calculates, for each of the plurality of pieces of frequency-domain information, a relative value between a time-frequency component included in one frequency-domain information and a time-frequency component included in another frequency-domain information; a mask generation unit that compares the relative value with an emphasized range set based on a relative value threshold stored in advance to generate a time-frequency mask that decreases a value of the frequency-domain information corresponding to the relative value which is outside the emphasized range; a mask multiplication unit that multiplies the time-frequency mask by the frequency-domain information to generate emphasized frequency-domain information; and a time-domain conversion unit that converts the emphasized frequency-domain information into an audio output signal indicated as being time-domain information.

The present invention provides an audio signal processing method of an audio signal processing device that acquires a plurality of audio signals acquired by sound acquisition means provided at different positions to generate an audio output signal in which sound in a predetermined range is emphasized among components included in the plurality of audio signals, the audio signal processing method including: a frequency-domain conversion step that converts each of the plurality of audio signals into frequency-domain information to generate a plurality of pieces of frequency-domain information; a relative value calculation step that calculates, for each of the plurality of pieces of frequency-domain information, a relative value between a time-frequency component included in one frequency-domain information and a time-frequency component included in another frequency-domain information; a mask generation step that compares the relative value with an emphasized range set based on a relative value threshold stored in advance to generate a time-frequency mask that decreases a value of the frequency-domain information corresponding to the relative value which is outside the emphasized range; a mask multiplication step that multiplies the time-frequency mask by the frequency-domain information to generate emphasized frequency-domain information; and a time-domain conversion step that converts the emphasized frequency-domain information into the audio output signal indicated as being time-domain information.

The present invention provides an audio signal processing program that is executed by an audio signal processing device including a storage unit that stores a relative value threshold in advance and an operation unit that executes a program, the audio signal processing program executing the following processing of: frequency-domain conversion processing that converts each of the plurality of audio signals acquired at different positions into frequency-domain information to generate a plurality of pieces of frequency-domain information; relative value calculation processing that calculates, for each of the plurality of pieces of frequency-domain information, a relative value between a time-frequency component included in one frequency-domain information and a time-frequency component included in another frequency-domain information; mask generation processing that compares the relative value with an emphasized range set based on a relative value threshold stored in advance to generate a time-frequency mask that decreases a value of the frequency-domain information corresponding to the relative value which is outside the emphasized range; mask multiplication processing that multiplies the time-frequency mask by the frequency-domain information to generate emphasized frequency-domain information; and time-domain conversion processing that converts the emphasized frequency-domain information into an audio output signal indicated as being time-domain information.

According to the audio signal processing device, the audio signal processing method, and the audio signal processing program of the present invention, it is possible to emphasize a desired audio signal with higher accuracy.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

First Embodiment

Figure 1:
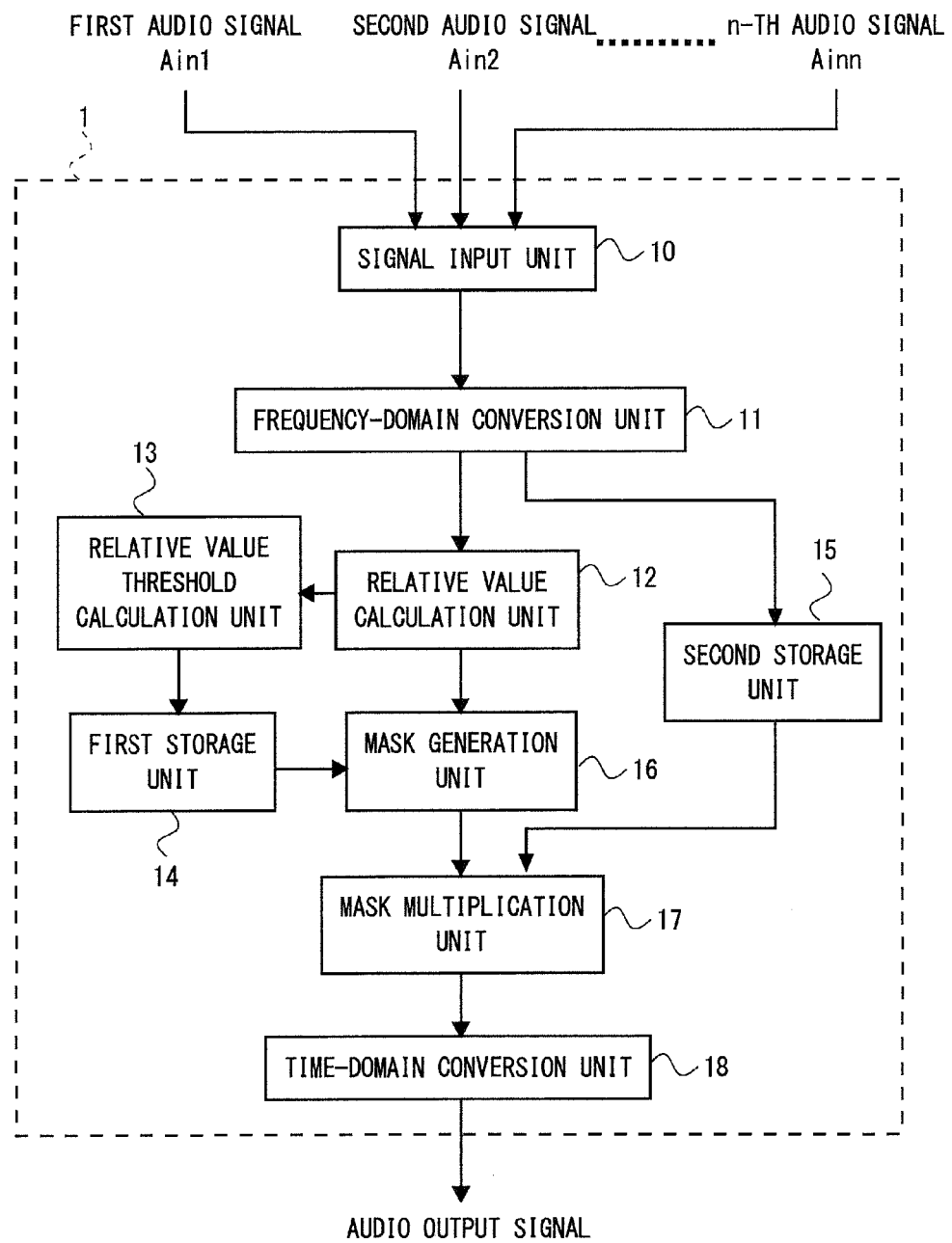
FIG. 1 is a block diagram of an audio signal processing device according to a first embodiment.

Hereinafter, with reference to the drawings, embodiments of the present invention will be described. FIG. 1 shows a block diagram of an audio signal processing device 1 according to the first embodiment. The audio signal processing device 1 according to the first embodiment acquires a plurality of audio input signals (first audio input signal Ain1 to n-th audio input signal Ainn shown in FIG. 1) from a plurality of sound acquisition means (e.g., sensors such as microphones) installed at different positions. In the following description, an example of processing of two audio input signals will be described. The audio signal processing device 1 according to the first embodiment emphasizes a predetermined audio signal (hereinafter referred to as a desired audio signal) corresponding to a predetermined time-frequency component included in the audio input signals that are input. The desired audio signal satisfies a condition of a phase difference and an amplitude ratio in a predetermined range among signal components included in, for example, a reference audio input signal which is one signal selected from the plurality of audio input signals. In the following description, in particular, the processing for emphasizing the desired audio signal of the audio signal processing device 1 according to the first embodiment will be described in detail.

As shown in FIG. 1, the audio signal processing device 1 includes a signal input unit 10, a frequency-domain conversion unit 11, a relative value calculation unit 12, a relative value threshold calculation unit 13, a first storage unit 14, a second storage unit 15, a mask generation unit 16, a mask multiplication unit 17, and a time-domain conversion unit 18. FIG. 1 shows an example achieved by process blocks implemented in hardware as a configuration of the audio signal processing device 1.

In the audio signal processing device 1, the signal input unit 10, the first storage unit, and the second storage unit are implemented in hardware. Further, the frequency-domain conversion unit 11, the relative value calculation unit 12, the relative value threshold calculation unit 13, the mask generation unit 16, the mask multiplication unit 17, and the time-domain conversion unit 18 are achieved by a program (e.g., audio signal processing program) executed by an operation unit such as a central processing unit (CPU) or a digital signal processor (DSP). In this case, the audio signal processing program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). Further, the program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line. Further, each component implemented by the program may be implemented in hardware.

The signal input unit 10 acquires the plurality of audio input signals Ain1-Ainn from the plurality of sound acquisition means (not shown). The signal input unit 10 converts the plurality of audio input signals Ain1-Ainn that are input into digital signals. When the audio input signals that are input are digital signals, there is no need to provide a configuration for converting audio signals into digital signals.

In the example in which the audio signal processing device 1 is used inside an automobile, the microphones are preferably installed in front (e.g., steering, sun visor, map lamp, dash board) of a desired sound source (mainly driver). The plurality of microphones are preferably installed with intervals of several centimeters or smaller in order to accurately calculate information of the phase difference and the amplitude ratio.

The frequency-domain conversion unit 11 converts the plurality of audio input signals Ain1-Ainn acquired in the signal input unit 10 into frequency-domain information for each audio input signal to generate a plurality of pieces of frequency-domain information. The frequency-domain conversion unit 11 divides the audio input signals by a window function having a predetermined frame length, and executes processing such as Fast Fourier Transform (FFT) for each frame that is divided to generate frequency-domain information. In the following description, the frequency-domain information is represented by $Xn(f,\tau)$, where $\tau$ represents a frame number, f represents a frequency, and n represents the number of the audio input signal. In summary, in the audio signal processing device 1 according to the first embodiment, frequency-domain information $X1(f,\tau)$ is generated corresponding to the first audio input signal and frequency-domain information $X2(f,\tau)$ is generated corresponding to the second audio input signal. The frequency-domain conversion unit 11 stores the frequency-domain information that is generated in the second storage unit 15 and outputs the frequency-domain information to the relative value calculation unit 12.

The relative value calculation unit 12 calculates, for each of the plurality of pieces of frequency-domain information, a relative value between the time-frequency component included in one frequency-domain information and the time-frequency component included in the other frequency-domain information, and generates a plurality of relative values corresponding to the plurality of pieces of frequency-domain information. More specifically, the relative value calculation unit 12 calculates, as a relative value, at least one of an amplitude relative value and a phase relative value. The amplitude relative value indicates the relative ratio of the amplitude component of the time-frequency component included in one frequency-domain information to the amplitude component of the time-frequency component included in the other frequency-domain information and the phase relative value indicates the difference between the phase component of the time-frequency component included in one frequency-domain information and the phase component of the time-frequency component included in the other frequency-domain information.

Here, one example of the method for calculating the relative value in the relative value calculation unit 12 according to the first embodiment will be described. In the relative value calculation unit 12, for example, an amplitude relative value $\alpha(f,\tau)$ of the frequency-domain information $X1(f,\tau)$ and the frequency-domain information $X2(f,\tau)$ is calculated based on Expression (1) and a phase relative value $\delta(f,\tau)$ of the frequency-domain information $X1(f,\tau)$ and the frequency-domain information $X2(f,\tau)$ is calculated based on Expression (2). When Expressions (1) and (2) are used to calculate the relative value, the reference audio signal is the first audio input signal. Further, to in Expression (2) represents an angular frequency.

$$\alpha(f,\tau)=\|X2(f,\tau)/X1(f,\tau)\| \qquad (1)$$

$$\delta(f,\tau)=lm(\log(X1(f,\tau)/X2(f,\tau)/\omega)) \qquad (2)$$

The relative value calculation unit 12 outputs the relative values that are calculated to the relative value threshold calculation unit 13 or the mask generation unit 16. While the details will be described later, the audio signal processing device 1 according to the first embodiment generates relative value thresholds used to generate a time-frequency mask by initial setting processing. Accordingly, in the initial setting processing operation, the audio signal processing device 1 outputs the relative value generated in the relative value calculation unit 12 to the relative value threshold calculation unit 13. In the normal operation, the audio signal processing device 1 outputs the relative value generated in the relative value calculation unit 12 to the mask generation unit 16.

The relative value threshold calculation unit 13 calculates the relative value thresholds based on the relative value generated based on setting audio signals input under predetermined conditions. More specifically, the relative value threshold calculation unit 13 causes generation of the setting audio signals set in advance using sound output means (not shown), and accumulates the relative values generated from the plurality of audio input signals acquired based on the setting audio signals for a predetermined period of time. The relative value threshold calculation unit 13 generates a two-dimensional histogram formed of the amplitude relative value and the phase relative value using the relative values that are accumulated. The relative value threshold calculation unit 13 determines relative value thresholds indicating the emphasized range using the two-dimensional histogram. The relative value threshold calculation unit 13 stores the relative value thresholds in the first storage unit 14. The details of the method for setting the emphasized range will be described later.

The mask generation unit 16 compares the emphasized range that is set based on the relative value thresholds stored in advance in the first storage unit 14 with each of the plurality of relative values to generate the time-frequency mask that decreases the value of the frequency-domain information corresponding to the relative value which is in the outside the emphasized range. The relative value input to the mask generation unit 16 is output from the relative value calculation unit 12. Further, the details of the method for generating the time-frequency mask will be described later.

The mask multiplication unit 17 multiplies the time-frequency mask generated by the mask generation unit 16 by the frequency-domain information stored in the second storage unit 15 to generate emphasized frequency-domain information. The details of the method for multiplying the time-frequency mask in the mask multiplication unit 17 will be described later. The time-domain conversion unit 18 converts the emphasized frequency-domain information into the audio output signal represented as time-domain information. More specifically, the time-domain conversion unit 18 converts the emphasized frequency-domain information into the audio output signal by, for example, IFFT processing. Further, the time-domain conversion unit 18 overlap-adds successive frames to output successive audio output signals.

The audio signal processing device 1 according to the first embodiment carries out processing for emphasizing audio signals issued from, for example, a specific range as desired audio signals using the process blocks stated above. When the desired audio signals issued from a specific range are acquired by a plurality of sound acquisition means installed at different positions, the difference in the amplitude or the phase between the plurality of audio input signals occurs mainly in a specific range based on the positional relation between the signal source that issues the desired audio signals and the plurality of sound acquisition means. The audio signal processing device 1 then separates desired audio signals from undesired audio signals based on the difference occurred in the phase or the signal of the plurality of audio input signals to emphasize the desired audio signals.

More specifically, the audio signal processing device 1 according to the first embodiment stores a specific range in which the amplitude ratio or the phase difference between the plurality of audio input signals occurred due to the positional relation between the signal source that issues the desired audio signals and the plurality of sound acquisition means mainly exists as relative value thresholds. Further, the audio signal processing device 1 according to the first embodiment compares the relative value thresholds with the relative value obtained from the plurality of audio input signals obtained in the normal operation state to generate the time-frequency mask that suppresses the time-frequency components of the undesired audio signals. The audio signal processing device 1 according to the first embodiment then multiplies the time-frequency mask by the audio input signals to suppress the undesired audio signals and emphasize the desired audio signals.

As described above, the audio signal processing device 1 according to the first embodiment generates the time-frequency mask using the relative value thresholds stored in the first storage unit 14 in advance in the normal operation to emphasize the desired audio signals. The relative value thresholds may be determined when the equipment is shipped and stored in the first storage unit 14. In order to carry out processing for emphasizing desired audio signals with higher accuracy, however, the relative value thresholds are preferably generated in a state in which the equipment is installed. The initial setting operation for generating the relative value thresholds is described as the operation of the audio signal processing device 1 according to the first embodiment, and then processing for emphasizing the desired audio signals of the audio signal processing device 1 will be described.

Figure 2:
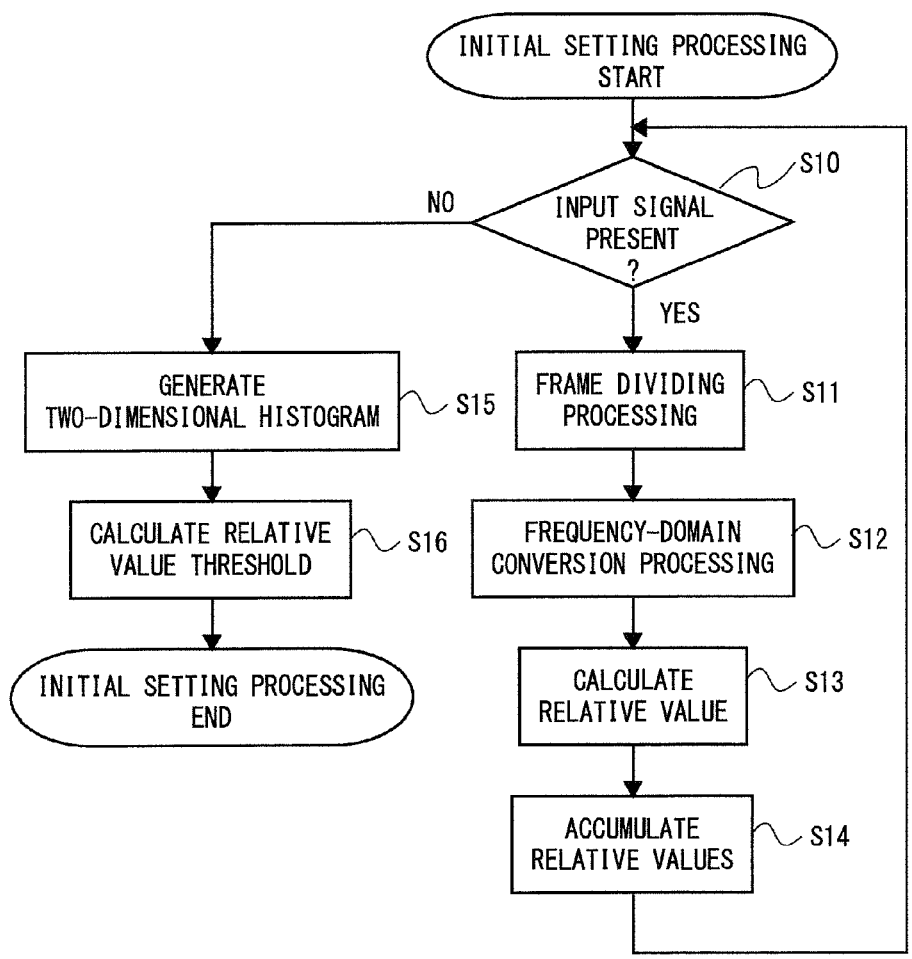
FIG. 2 is a flowchart showing relative value threshold generation processing in the audio signal processing device according to the first embodiment.

FIG. 2 shows a flowchart of the initial setting operation of the audio signal processing device 1 according to the first embodiment. The flowchart shown in FIG. 2 only shows specific processing for calculating the relative value thresholds in the relative value threshold calculation unit 13. In the audio signal processing device 1 according to the first embodiment, when the processing of FIG. 2 is started, the relative value threshold calculation unit 13 causes generation of setting audio signals using the sound output means which is not shown in FIG. 1.

It is preferable that, in this initial setting operation, the setting audio signals are generated in a situation in which there are only a few number of undesired audio signals such as noise other than desired audio signals (e.g., setting audio signals). According to this configuration, it is possible to make clearer the peak of the two-dimensional histogram generated when the relative value thresholds are calculated.

Further, the setting audio signals are preferably generated by the sound output means installed at a position where the issue of the desired audio signals is planned. According to such a configuration, it is possible to artificially reproduce the phase relative value and the amplitude relative value expected for desired audio signals and to generate the relative value thresholds with higher accuracy. The setting audio signals may be generated by the user producing a sound at a predetermined position.

In the audio signal processing device 1 according to the first embodiment, the operation based on the flowchart shown in FIG. 2 is started according to the generation of the setting audio signals from the sound output means that is provided outside based on an instruction by the relative value threshold calculation unit 13.

As shown in FIG. 2, the audio signal processing device 1 determines whether or not the input signal (e.g., audio input signal) is present (Step S10), and repeatedly executes the operations of Steps S11 to S14 for a period of time during which the audio input signals are input.

In Step S11, the frequency-domain conversion unit 11 carries out frame dividing processing. In Step S12, the frequency-domain conversion unit 11 converts the audio input signals from time-domain information to frequency-domain information. In Step S13, the relative value calculation unit 12 calculates the relative value between the plurality of audio input signals. In Step S14, the relative value threshold calculation unit 13 accumulates the relative values calculated by the relative value calculation unit 12 in, for example, the first storage unit 14.

When it is determined in Step S10 that the audio input signal is stopped (NO in Step S10), the audio signal processing device 1 performs processing of Steps S15 and S16. In Step S15, the relative value threshold calculation unit 13 generates the two-dimensional histogram from the relative value information that are accumulated. In Step S16, the relative value threshold calculation unit 13 calculates the relative value thresholds from the two-dimensional histogram that is generated.

Figure 3:
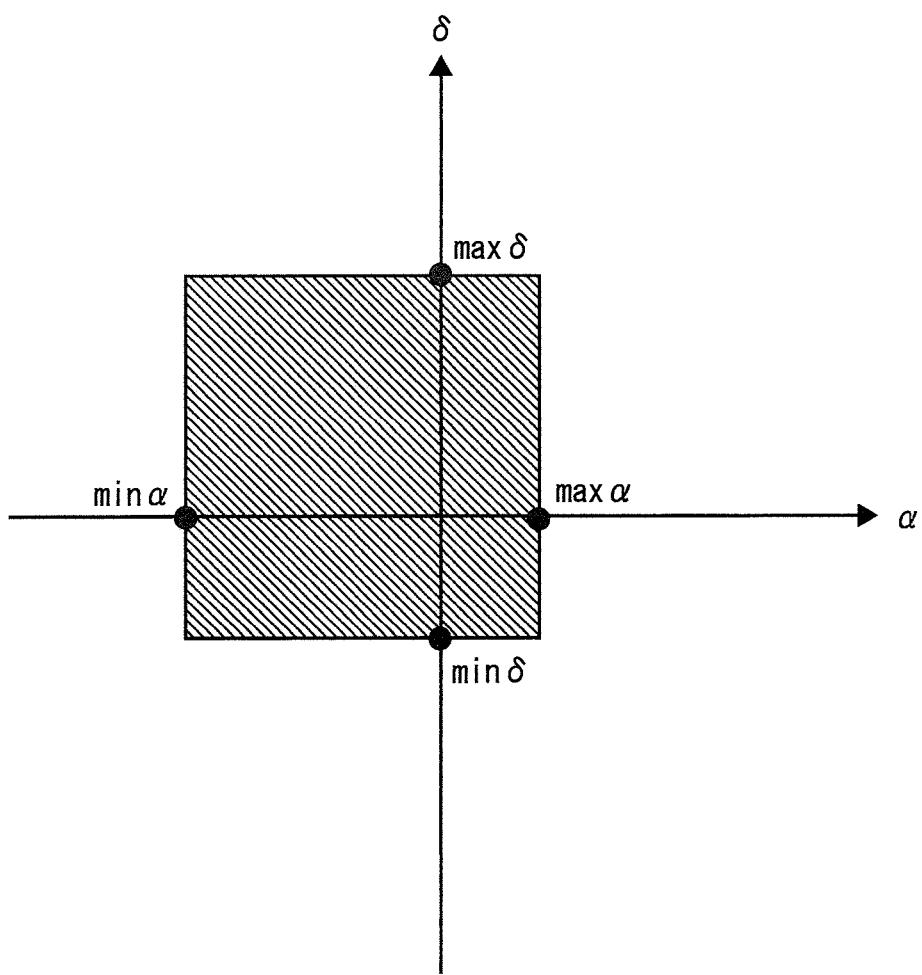
FIG. 3 is a diagram showing a first example of an emphasized range including a desired audio signal in the audio signal processing device according to the first embodiment.
Figure 4:
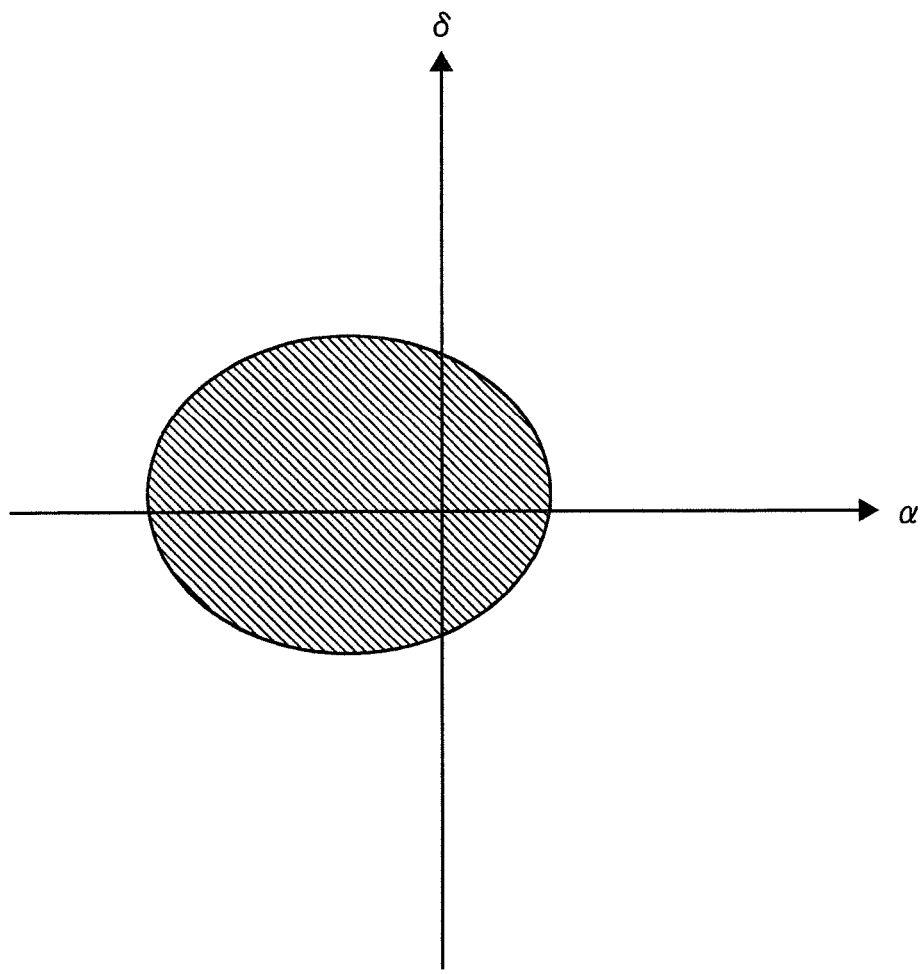
FIG. 4 is a diagram showing a second example of the emphasized range including the desired audio signal in the audio signal processing device according to the first embodiment.
Figure 5:
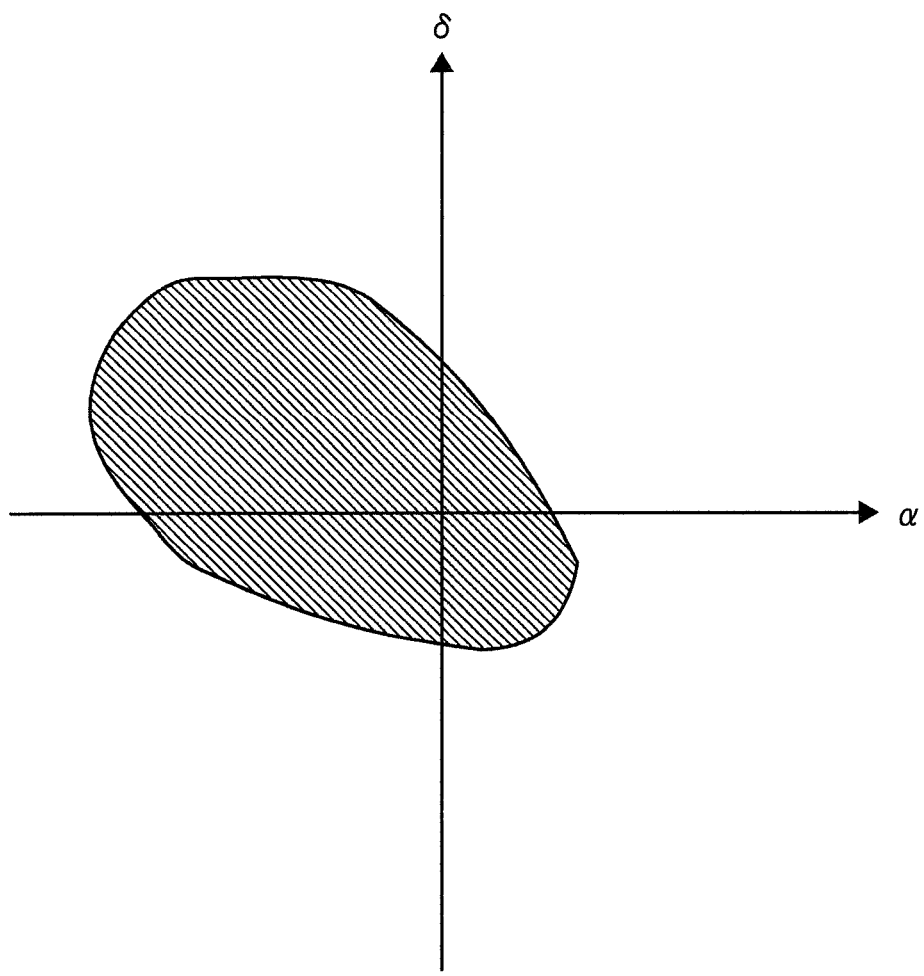
FIG. 5 is a diagram showing a third example of the emphasized range including the desired audio signal in the audio signal processing device according to the first embodiment.

Now, a relation between the two-dimensional histogram and the relative value thresholds will be described in more detail. FIGS. 3-5 show first to third examples of the emphasized range including desired audio signals in the audio signal processing device according to the first embodiment.

In the two-dimensional histograms shown in FIGS. 3 to 5, the first axis indicates an amplitude relative value $\alpha$, the second axis indicates a phase relative value $\delta$, the degree indicating the appearance frequency of the relative value is represented as the height information, and an emphasized range, which is a part including the relative values equal to or more than a predetermined degree, is indicated by hatching. In summary, when the peak that appears on the two-dimensional histogram is high, it is determined that the appearance frequency of the relative value corresponding to the coordinates is high. The sum of the energy values or the amplitude values of the time-frequency component corresponding to the coordinates may be used in place of the degree. This is because it is highly likely that the time-frequency component with large amplitude value or large energy value is the time-frequency component of the desired sound source. The relative value threshold calculation unit 13 in the audio signal processing device 1 according to the first embodiment sets the range including the part of the set of relative values whose degree is equal to or larger than a predetermined degree as an emphasized range. In the following description, a peak indicating the degree equal to or larger than the predetermined degree is referred to as a significant peak. This predetermined degree may be a statistical value such as a median or an average value of the degree. The predetermined value may be a value positioned between the statistical value and the maximum degree value, the sum of the statistical value and a value indicating a variation such as a standard deviation, or a value obtained by multiplying the maximum degree value by a predetermined coefficient.

In the first example shown in FIG. 3, the upper-limit value of the amplitude relative value in the range having a significant peak on the two-dimensional histogram is determined as an amplitude ratio upper-limit value max α and the lower-limit value is determined as an amplitude ratio lower-limit value min α. Further, the upper-limit value of the phase relative value in the range having a significant peak on the two-dimensional histogram is determined as a phase difference upper-limit value max δ and the lower-limit value is determined as a phase difference lower-limit value min δ In the first example shown in FIG. 3, the rectangular region determined from the four values of the amplitude ratio upper-limit value max α, the amplitude ratio lower-limit value min α, the phase difference upper-limit value max δ, and the phase difference lower-limit value min δ is determined to be the emphasized range. In this case, the relative value threshold calculation unit 13 stores four values of the amplitude ratio upper-limit value max α, the amplitude ratio lower-limit value min α, the phase difference upper-limit value max δ, and the phase difference lower-limit value min δ as the relative value thresholds.

In the second example shown in FIG. 4, the area having a predetermined shape (e.g., ellipse or circle) indicating the range including the most part of the relative values having a significant peak on the two-dimensional histogram is determined as the emphasized range. In this case, the relative value threshold calculation unit 13 stores, as the relative value thresholds, the relative value indicating the central point having a predetermined shape and information indicating the range (e.g., radius of the circle).

In the third example shown in FIG. 5, the area surrounding the range including the relative values having a significant peak on the two-dimensional histogram is determined as the emphasized range. In this case, the relative value threshold calculation unit 13 stores the relative values positioned in the outer periphery of the emphasized range as the relative value thresholds.

Figure 6:
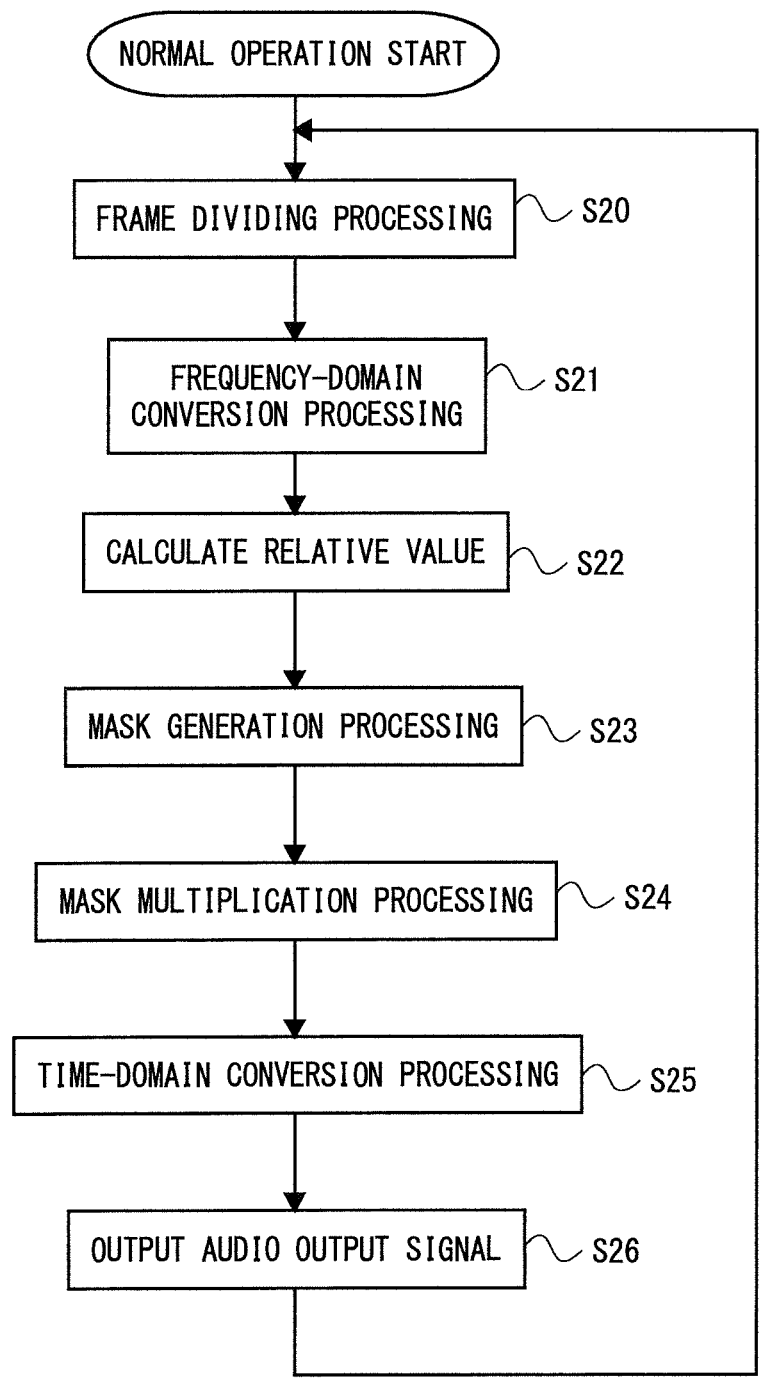
FIG. 6 is a flowchart of signal emphasizing processing in the audio signal processing device according to the first embodiment.

Next, signal emphasizing processing of the audio signal processing device 1 according to the first embodiment will be described. FIG. 6 shows a flowchart of the signal emphasizing processing in the audio signal processing device according to the first embodiment. As described above, the audio signal processing device 1 according to the first embodiment repeatedly executes the signal emphasizing processing in the normal operation.

As shown in FIG. 6, the audio signal processing device 1 according to the first embodiment repeatedly executes the operations in Steps S20 to S26 in the normal operation. In Step S20, the frequency-domain conversion unit 11 performs frame dividing processing. In Step S21, the frequency-domain conversion unit 11 converts the audio input signals from the time-domain information into the frequency-domain information. In Step S22, the relative value calculation unit 12 calculates the relative value between the plurality of audio input signals.

In Step S23, the mask generation unit 16 generates the time-frequency mask. In Step S24, mask multiplication processing is carried out to multiply the time-frequency mask generated in Step S23 by the frequency-domain information generated in Step S21. In Step S25, the frequency-domain information on which mask multiplication processing in Step S24 is executed is converted into the audio output signal represented by the time-domain information. In Step S26, this audio output signal is output. When the audio output signal that is output is a monaural signal, it is sufficient that the frequency-domain information that is converted in Step S25 corresponds only to one of the plurality of audio input signals.

The mask generation processing in Step S23 will be described in more detail. In the mask generation processing, the mask generation unit 16 refers to the relative value thresholds stored in the first storage unit 14 to recognize the emphasized range based on the relative value thresholds. The mask generation unit 16 then determines the value of the time-frequency mask applied to the frequency-domain information corresponding to the relative value processed at the current cycle depending on whether the relative value input from the relative value calculation unit 12 is within the emphasized range or outside the emphasized range.

The value of the time-frequency mask is 1 when, for example, the relative value is within the emphasized range and 0 when the relative value is outside the emphasized range. Alternatively, the value of the time-frequency mask may be gradually or successively decreased according to the distance between the emphasized range and the relative value or the distance from a predetermined position (e.g., center) in the emphasized range.

Further, in the audio signal processing device 1 according to the first embodiment, mask smoothing processing can be performed on the time-frequency mask applied in Step S24. In the mask smoothing processing, the value of the time-frequency mask calculated for the temporally successive plurality of frames is used. Accordingly, when the mask smoothing processing is carried out, it is required to accumulate the time-frequency mask generated in Step S23 for a plurality of frames in the first storage unit 14 or the like.

Figure 7:
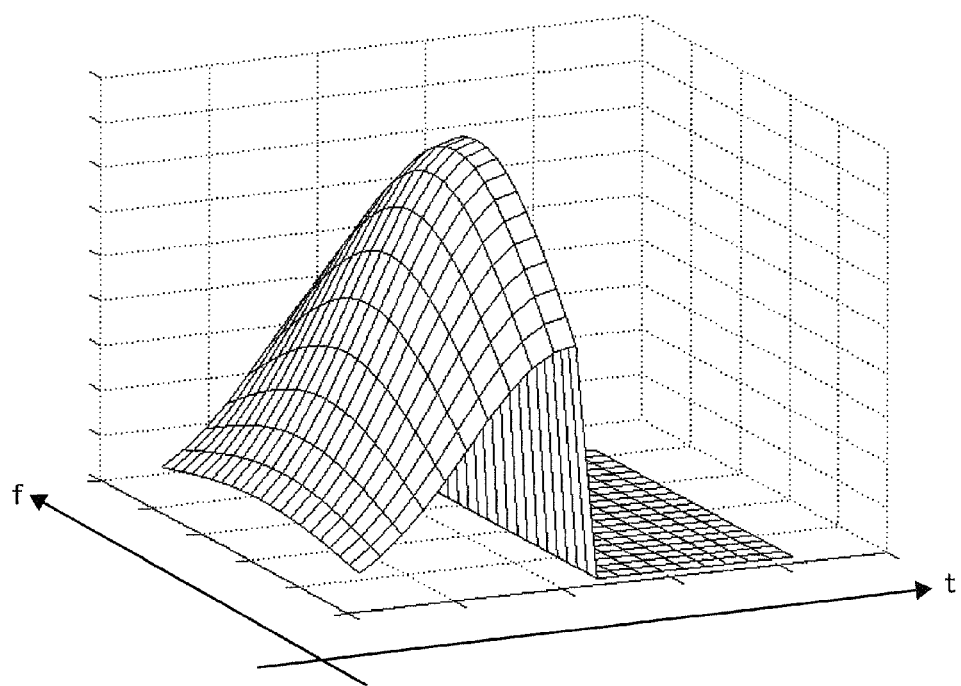
FIG. 7 is a diagram showing one example of a mask smoothing filter applied to the audio signal processing device according to the first embodiment.

This mask smoothing processing is performed in the mask generation processing. In the mask smoothing processing, a smoothing filter such as a two-dimensional Gaussian filter is convolved to smooth the time-frequency mask. FIG. 7 shows one example of the mask smoothing filter applied in the audio signal processing device according to the first embodiment. FIG. 7 shows coefficients of the mask smoothing filter applied when the mask generation is performed in real time. In the mask smoothing filter shown in FIG. 7, the coefficients are set in such a manner that coefficients multiplied by older time-frequency masks become smaller. Further, in the mask smoothing filter shown in FIG. 7, the tap length (length in the axis direction indicated by t) in the direction of the frequency axis (axis indicated by f) is set so that high-frequency components are longer and low-frequency components are shorter.

With the use of such a mask smoothing filter, it is possible to reduce musical noise that occurs due to abrupt fluctuations of the time-frequency component.

As will be understood from the above description, the audio signal processing device 1 according to the first embodiment determines the value of the time-frequency mask adapted to the audio input signals that are input based on the magnitude relation between the relative value thresholds stored in advance and the relative value generated based on the audio input signals successively input. The audio signal processing device 1 according to the first embodiment is therefore able to achieve higher sound source separation ability compared to the case in which the value of the time-frequency mask is determined only based on the relative value generated from the audio input signals that are input.

Further, the audio signal processing device 1 according to the first embodiment determines the value of the time-frequency mask by the comparison between the relative value thresholds that are stored in advance and the relative value that is calculated in real time. Accordingly, the audio signal processing device 1 according to the first embodiment does not require the complicated operation to generate the time-frequency mask, whereby it is possible to carry out processing for emphasizing a desired audio signal in real time with fewer processes.

Further, the audio signal processing device 1 according to the first embodiment is able to set the relative value thresholds in the environment in which the audio signal processing device 1 is installed. At this time, the audio signal processing device 1 generates the two-dimensional histogram based on the setting audio signals input in a predetermined period of time, and sets the relative value thresholds based on the degree of the relative value on the two-dimensional histogram. Accordingly, the audio signal processing device 1 is able to generate the relative value thresholds with reduced effect of noise. The audio signal processing device 1 is therefore able to generate the relative value thresholds that achieve sound source separation ability higher than that in the relative value thresholds that are determined in advance.

Second Embodiment

In the audio signal processing device 1 according to the first embodiment, a so-called non-directional microphone having flat directional characteristics is preferably employed. There is a case, however, in which a microphone having predetermined directional characteristics or a low-cost microphone has to be employed in terms of the system configuration. When the microphone having directional characteristics is employed, a correct relative value may not be calculated in two microphones for signal components coming from a specific direction in terms of the structure. When the low-cost microphone is employed, a correct relative value may not be calculated as well since there may be individual differences in the hardware performance. In such a case, the distribution of the two-dimensional histogram of the phase difference and the amplitude ratio calculated from the plurality of microphones is more complicated than that when the non-directional microphone is used, and it is difficult to define the appropriate range of the amplitude ratio and the phase difference.

In the second embodiment, a process method for achieving high sound source separation ability even when the directional microphone or the low-cost microphone is used will be described. The audio signal processing device according to the second embodiment generates a histogram for each of the phase difference and the amplitude ratio instead of generating a two-dimensional histogram including the phase difference and the amplitude ratio, so as to obtain a distribution range. In the audio signal processing device according to the second embodiment, the number of desired sound sources is one in principle. In this embodiment, it is only required that the signal components (noise components) derived from a desired sound source and the signal components derived from other sound sources can be separated from each other, and it is not necessarily required to use the two-dimensional histogram.

The only difference between the audio signal processing device 1 according to the first embodiment and the audio signal processing device according to the second embodiment is the processing of the relative value threshold calculation unit 13 in the initial setting processing, and the audio signal processing device 1 according to the first embodiment and the audio signal processing device according to the second embodiment have the same configuration. Accordingly, in the description of the audio signal processing device according to the second embodiment, the description of the whole configuration will be omitted and only the details of the processing will be described.

First, in the audio signal processing according to the second embodiment, similar to the audio signal processing according to the first embodiment, the frequency-domain conversion unit 11 converts the signal input from the signal input unit 10 into the frequency-domain signal by, and the relative value calculation unit 12 calculates the amplitude ratio and the phase difference of each time-frequency component.

Next, in the audio signal processing according to the second embodiment, a histogram is separately generated for each of the amplitude ratio and the phase difference in place of the two-dimensional histogram generated in Step S15 shown in FIG. 2. It is preferable in the histogram that the horizontal axis indicates the amplitude ratio or the phase difference and the vertical axis indicates the degree, the sum of the amplitude values of the corresponding time-frequency component or the sum of the energy values of the corresponding time-frequency component. In summary, in the relative value threshold calculation unit 13 according to the second embodiment, the histogram of the relative value having a predetermined time length can be generated using the sum of the energy or the amplitude values of the time-frequency component which belongs to each class of the histogram in place of the degree indicating the appearance frequency of the time-frequency component. Further, since the fluctuations of the histogram may be larger depending on the class width, smoothing processing is preferably executed. The relative value calculation unit 13 according to the second embodiment then calculates the maximum value and the minimum value of the relative values included in the set including the relative value corresponding to the maximum value among the set of the relative values where the degree or the sum of the amplitude values or the energy becomes equal to or larger than a predetermined value as relative value thresholds. In the audio signal processing device according to the second embodiment, the relative value thresholds are calculated by the above method, and then the relative value thresholds are stored in the first storage unit 14, thereby completing the initial setting processing. The following normal operation processing is similar to that in the audio signal processing device 1 according to the first embodiment. In the following description, processing of the relative value threshold calculation unit 13 will be described with reference to specific examples.

Now, the difference between the histogram of the non-directional microphone and the histogram of a forward directional microphone will be described. In the description of the histogram of the non-directional microphone, an example in which the distance between the two microphones and the sound source is constant is described.

Figure 8:
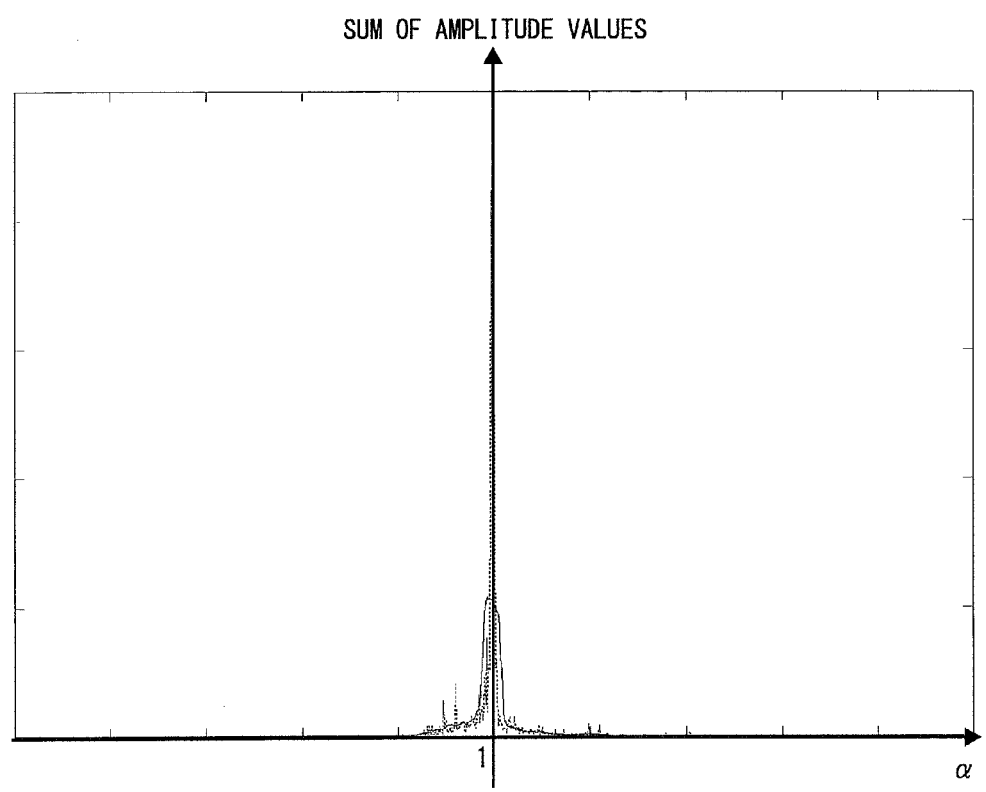
FIGS. 8 and 9 are diagrams of examples of a histogram when a non-directional microphone is used.
Figure 9:
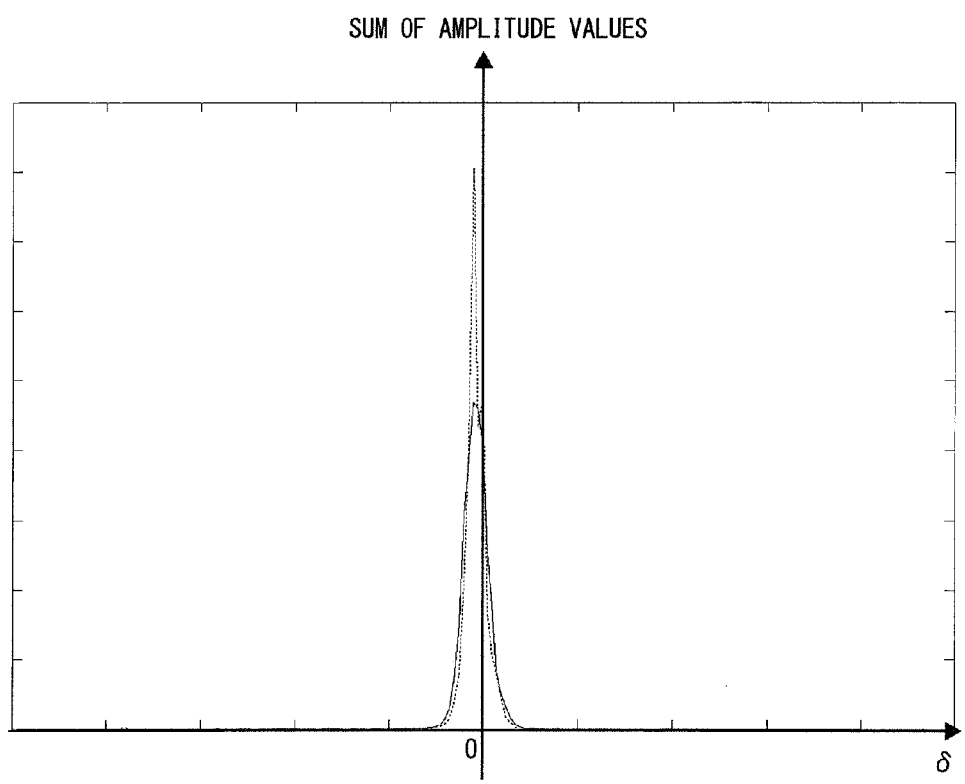

FIGS. 8 and 9 show examples of the histogram when the non-directional microphone is used. In FIGS. 8 and 9, dotted lines represent actual measurement values and solid lines represent values smoothed by the moving average. In FIG. 8, the horizontal axis (e.g., x axis) indicates the amplitude ratio and the vertical axis (e.g., y axis) indicates the sum of the amplitude values. In FIG. 9, the horizontal axis (e.g., x axis) indicates the phase difference and the vertical axis (e.g., y axis) indicates the sum of the amplitude values.

It is seen from the example shown in FIG. 8 that the peak of the histogram appears at around the origin where the amplitude ratio $\alpha$ is 1. It is also seen from the example shown in FIG. 9 that the peak of the histogram appears at around the origin where the phase difference δ is 0. As will be clear from FIGS. 8 and 9, when the non-directional microphone is used and a speaker is present at the front of the non-directional microphone, every histogram has a distribution having the precipitous peak at the origin. In the two-dimensional histogram, a substantially conical precipitous peak is produced, and it is easy to acquire the distribution range of the histogram.

Figure 10:
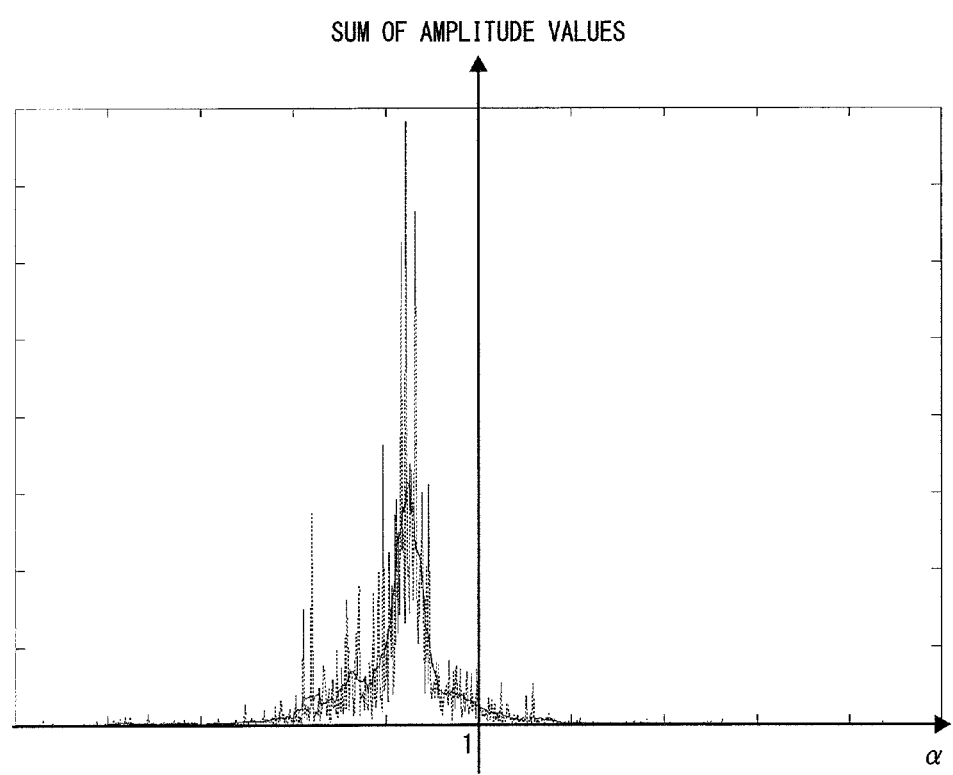
FIG. 10 is a diagram of one example of a histogram when a directional microphone is used.
Figure 11:
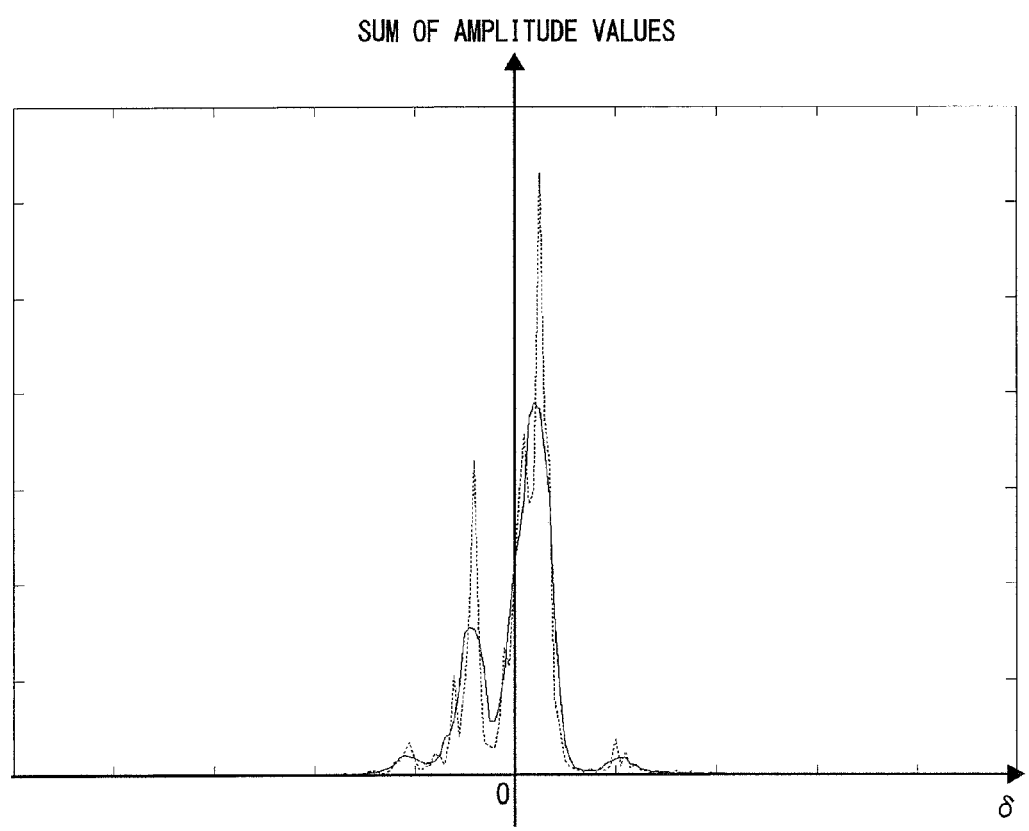
FIG. 11 is a diagram of one example of a histogram when the non-directional microphone is used.

Next, FIGS. 10 and 11 show examples of the histogram when the forward directional microphone is used. In the description of the histogram of the forward directional microphone, an example in which the distance between the two microphones and the sound source varies will be described.

In both of FIGS. 10 and 11, dotted lines represent actual measurement values and solid lines represent values smoothed by the moving average. In FIG. 10, the horizontal axis (e.g., x axis) indicates the amplitude ratio and the vertical axis (e.g., y axis) indicates the sum of the amplitude values, and in FIG. 11, the horizontal axis (e.g., x axis) indicates the phase difference and the vertical axis (e.g., y axis) indicates the sum of the amplitude values.

In the example shown in FIG. 10, the peak is at a position apart from the origin where the amplitude ratio α is 1, and is coincident with the positional relation of the above sound source and the microphone. Compared to the case in which the non-directional microphone is used, the distribution range is wider, the width of the amplitude value is wider, and the histogram shows a random distribution.

Further, in the example shown in FIG. 11, the peak is at a position apart from the origin where the phase difference δ is 0 and the distance between the origin and the peak is larger than that of the case in which the non-directional microphone is used. There are a plurality of small peaks as well, and the two-dimensional histogram is not distributed in a conical shape, as is different from that of the case in which the non-directional microphone is used, and is distributed in a complicated way depending on its circumstances. The two-dimensional histogram may be, for example, distributed like a range of mountains or has small peaks that are scattered over a wide range. In such a complicated distribution, there are a lot of conditions to determine whether the histogram is within a range of the relative value thresholds, which may disturb real-time processing.

As described above, when the directional microphone is used, the distribution of the histogram is complicated in both cases in which the amplitude ratio is employed as the horizontal axis and the phase difference is employed as the horizontal axis. When the audio signal processing is carried out on the two-dimensional histogram using the amplitude ratio and the phase difference, the distribution of the histogram is more complicated and it is difficult to perform sound source separation. In the audio signal processing method according to the second embodiment, however, the histogram is generated for each of the amplitude ratio and the phase difference. It is therefore possible to maximize the noise reduction effect with respect to the process time for the audio signals acquired by the relation between the microphone and the sound source as shown in FIGS. 10 and 11.

Figure 12:
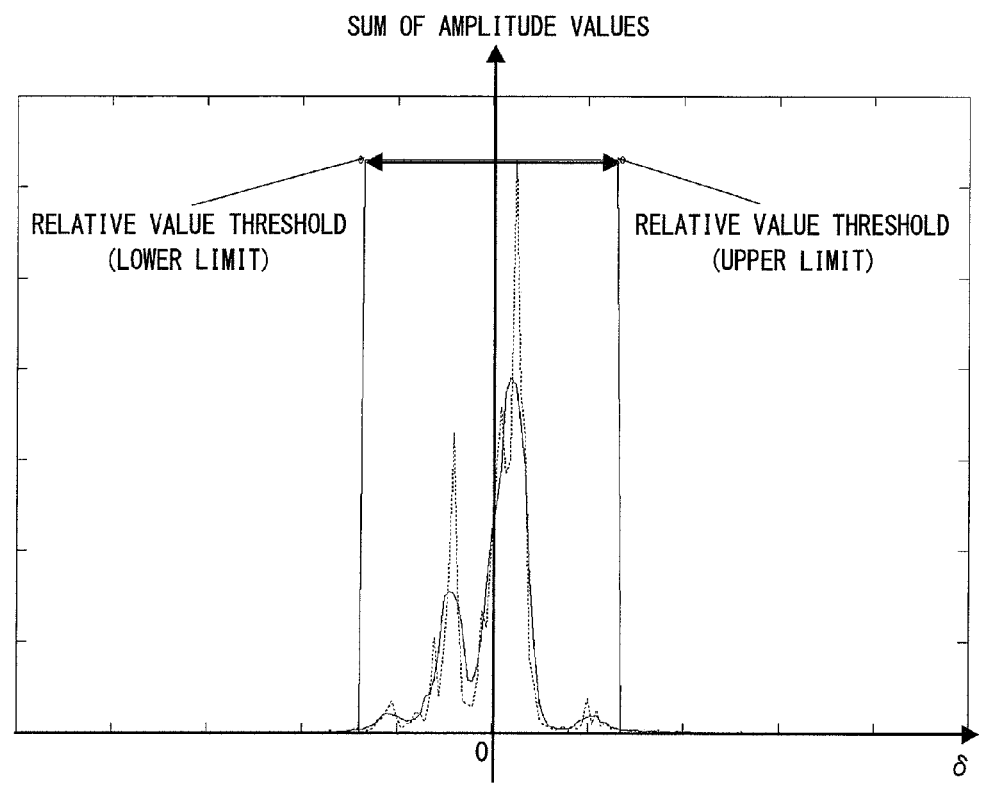
FIG. 12 is a diagram showing a relation between a histogram and relative value thresholds in the histogram with phase difference on the horizontal axis.

In the audio signal processing according to the second embodiment, after the histogram is generated, the relative value thresholds are calculated for each of the amplitude ratio and the phase difference from the range in which the time-frequency components are distributed. Specifically, in the audio signal processing according to the second embodiment, the upper-limit value and the lower-limit value of a range in which the sum of the amplitude values in the vertical axis in the histogram is equal to or larger than a predetermined value are set as the relative value thresholds. FIG. 12 shows a diagram showing a relation between the histogram and the relative value thresholds in the histogram with phase difference on the horizontal axis. As shown in FIG. 12, in the audio signal processing method according to the second embodiment, the upper-limit value and the lower-limit value of a range in which the histogram becomes equal to or larger than a predetermined value are set as the relative value thresholds. In the case of vehicle interiors, due to signal components delayed owing to the reflection from a side window or the like, a peak may be generated at a location apart from the maximum peak position and the range in which the histogram is equal to or larger than the predetermined value may occur. In such a case, it is required to exclude this range. It is therefore preferable that the range for calculating the relative value thresholds be a range including the maximum peak position.

Figure 13:
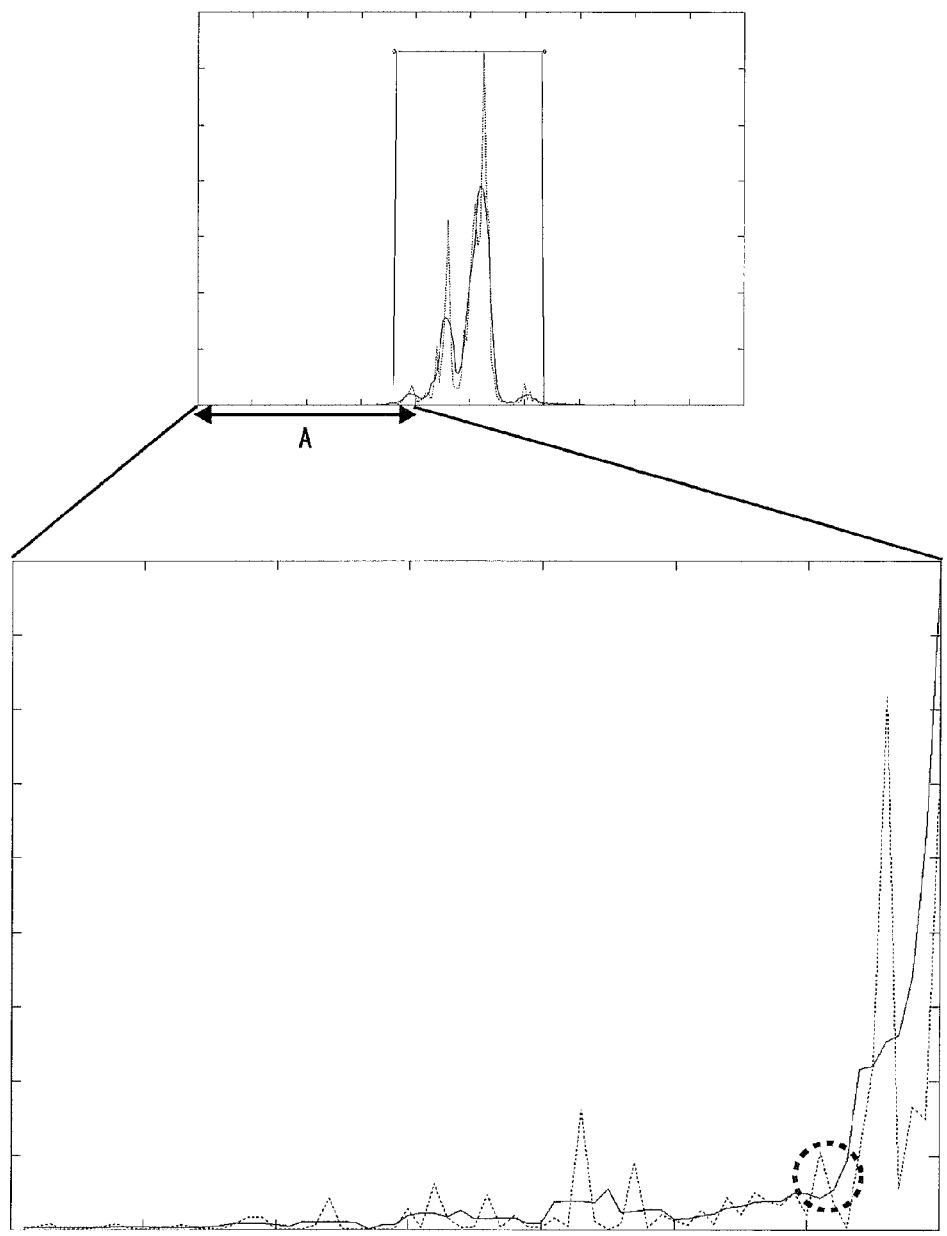
FIG. 13 is a diagram in which a part near the relative value threshold on a side of a lower-limit value (range A) is enlarged in a histogram with amplitude ratio on the horizontal axis according to a second embodiment.

Now, a method for calculating a predetermined value used to calculate the relative value thresholds will be described. In the calculation of the predetermined value, a method for setting the predetermined value in view of the shape of the histogram is important. FIG. 13 shows a diagram in which a part near the relative value threshold on a side of the lower-limit value (range A) is enlarged in the histogram with amplitude ratio on the horizontal axis according to the second embodiment. The upper-limit value and the lower-limit value of the relative value threshold are substantially coincident with the point from which the amplitude ratio precipitously increases to the peak as shown in the circle shown by dotted lines in the enlarged view of FIG. 13. This is because, since the time-frequency component of the desired signal component appears, the amplitude value suddenly increases. However, since the parts of the histogram in the right and left ends that gradually approach the x axis greatly fluctuate as shown in the enlarged view of FIG. 13, only the consideration of the amount of increase in the histogram is not sufficient to calculate the point. Accordingly, the method for detecting the point includes a method for executing smoothing derivation of the histogram and to calculate the extreme value of the derivative value.

There is another method for calculating a statistical value such as an average value from the histogram to use the statistical value as the predetermined value. However, when the statistical value such as the average value is simply calculated from the whole section of the histogram, there is a wide gap of values between the part around the peak and the parts of the histogram in the right and left ends that gradually approach the x axis, which results in the calculation of a value larger than the desired predetermined value. In short, the range of the relative value thresholds is narrowly calculated. In order to avoid this situation, a provisional predetermined value (e.g., value obtained by multiplying the maximum value by 0.1) is first calculated once based on the maximum peak value, and the sections with values equal to or larger than this value are excluded. Next, a statistical value such as an average value is calculated from the remaining section to use the statistical value as the predetermined value. According to these steps, it is possible to accurately grasp the precipitous increase point as shown in the dotted circle constantly larger than the part that gradually approaches the x axis shown in FIG. 13 as the predetermined value.

As will be understood from the above description, in the audio signal processing method according to the second embodiment, the histogram is generated for each of the phase difference and the amplitude ratio of audio signals acquired from two microphones, and the relative value thresholds are calculated from the histogram. It is therefore possible to improve the sound source separation ability for audio signals acquired by the low-cost microphone or the directional microphone in which the histogram is complicated.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

For example, a plurality of positional relations may be set as the positional relation of the sound acquisition means and the signal source of the desired audio signal, a plurality of relative value thresholds for each positional relation may be stored in the first storage unit 14, and the relative value thresholds that are used may be switched depending on the situation in which the audio signal processing device 1 is used.

What is claimed is:

1. An audio signal processing device comprising:
   a frequency-domain conversion unit that converts each of a plurality of audio input signals acquired at different positions into frequency-domain information to generate a plurality of pieces of frequency-domain information;
   a relative value calculation unit that calculates, for each of the plurality of pieces of frequency-domain information, a relative value between a time-frequency component included in one frequency-domain information and a time-frequency component included in another frequency-domain information;
   a mask generation unit that compares the relative value with an emphasized range set based on a relative value threshold stored in advance to generate a time-frequency mask that decreases a value of the frequency-domain information corresponding to the relative value which is outside the emphasized range;
   a mask multiplication unit that multiplies the time-frequency mask by the frequency-domain information to generate emphasized frequency-domain information;
   a time-domain conversion unit that converts the emphasized frequency-domain information into an audio output signal indicated as being time-domain information; and
   a relative value threshold calculation unit that calculates the relative value threshold based on the relative value generated from the audio input signals acquired in a predetermined period;
   wherein,
   the relative value threshold calculation unit generates a histogram of the relative value having a predetermined time length, and
   the histogram uses, in place of a degree indicating an appearance frequency of the time-frequency component, a sum of the amplitude values of the time-frequency component belonging to each class of the histogram or a sum of energy of the corresponding time-frequency component.

2. The audio signal processing device according to claim 1, wherein the relative value threshold calculation unit calculates the relative value threshold based on the relative value generated based on a setting audio signal input under a predetermined condition.

3. The audio signal processing device according to claim 1, wherein the relative value calculation unit sets a maximum value and a minimum value of the relative values included in a set including a relative value corresponding to the maximum value as a relative value threshold among a set of the relative values in which the sum of the amplitude values of the time-frequency component or the sum of the energy of the corresponding time-frequency component becomes equal to or larger than a predetermined value.

4. The audio signal processing device according to claim 1, wherein the mask multiplication unit manipulates the value of the time-frequency mask by a mask smoothing filter that is determined in advance to multiply the time-frequency mask after manipulation by the frequency-domain information.

5. The audio signal processing device according to claim 1, wherein the relative value calculation unit calculates at least one of an amplitude relative value and a phase relative value as the relative values, the amplitude relative value indicating a relative ratio of an amplitude component of the time-frequency component included in one frequency-domain information to an amplitude component of the time-frequency component included in the other frequency-domain information, and the phase relative value indicating a relative ratio of a phase component of the time-frequency component included in one frequency-domain information to a phase component of the time-frequency component included in the other frequency-domain information.

6. An audio signal processing method of an audio signal processing device that acquires a plurality of audio signals acquired by sound acquisition means provided at different positions to generate an audio output signal in which sound in a predetermined range is emphasized among components included in the plurality of audio signals, the audio signal processing method comprising:
   a frequency-domain conversion step that converts each of the plurality of audio signals into frequency-domain information to generate a plurality of pieces of frequency-domain information;
   a relative value calculation step that calculates, for each of the plurality of pieces of frequency-domain information, a relative value between a time-frequency component included in one frequency-domain information and a time-frequency component included in another frequency-domain information;
   a mask generation step that compares the relative value with an emphasized range set based on a relative value threshold stored in advance to generate a time-frequency mask that decreases a value of the frequency-domain information corresponding to the relative value which is outside the emphasized range;
   a mask multiplication step that multiplies the time-frequency mask by the frequency-domain information to generate emphasized frequency-domain information;
   a time-domain conversion step that converts the emphasized frequency-domain information into the audio output signal indicated as being time-domain information; and
   a relative value threshold calculation step that calculates the relative value threshold based on the relative value generated from the audio input signals acquired in a predetermined period;
   wherein,
   the relative value threshold calculation step generates a histogram of the relative value having a predetermined time length, and the histogram uses, in place of a degree indicating an appearance frequency of the time-frequency component, a sum of the amplitude values of the time-frequency component belonging to each class of the histogram or a sum of energy of the corresponding time-frequency component.

7. A non-transitory computer-readable medium including instructions executed by an audio signal processing device comprising a storage unit that stores a relative value threshold in advance and an operation unit that executes a program, the instructions comprising:

frequency-domain conversion processing that converts each of the plurality of audio signals acquired at different positions into frequency-domain information to generate a plurality of pieces of frequency-domain information;

relative value calculation processing that calculates, for each of the plurality of pieces of frequency-domain information, a relative value between a time-frequency component included in one frequency-domain information and a time-frequency component included in another frequency-domain information;

mask generation processing that compares the relative value with an emphasized range set based on a relative value threshold stored in advance to generate a time-frequency mask that decreases a value of the frequency-domain information corresponding to the relative value which is outside the emphasized range;

mask multiplication processing that multiplies the time-frequency mask by the frequency-domain information to generate emphasized frequency-domain information;

time-domain conversion processing that converts the emphasized frequency-domain information into an audio output signal indicated as being time-domain information; and a relative value threshold calculation processing that calculates the relative value threshold based on the relative value generated from the audio input signals acquired in a predetermined period;

wherein, the relative value threshold calculation processing generates a histogram of the relative value having a predetermined time length, and the histogram uses, in place of a degree indicating an appearance frequency of the time-frequency component, a sum of the amplitude values of the time-frequency component belonging to each class of the histogram or a sum of energy of the corresponding time-frequency component.

* * * * *